US008924499B2

(12) United States Patent
Allen et al.

(10) Patent No.: US 8,924,499 B2
(45) Date of Patent: Dec. 30, 2014

(54) OPERATING SYSTEM MIGRATION WITH MINIMAL STORAGE AREA NETWORK RECONFIGURATION

(75) Inventors: James P. Allen, Austin, TX (US); Daniel G. Eisenhauer, Austin, TX (US); Giles Roger Frazier, Austin, TX (US); Robert George Kovacs, Austin, TX (US); Satya Prakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2420 days.

(21) Appl. No.: 11/011,244

(22) Filed: Dec. 14, 2004

(65) Prior Publication Data

US 2006/0130052 A1 Jun. 15, 2006

(51) Int. Cl.
G06F 15/167 (2006.01)
G06F 15/177 (2006.01)
G06F 15/173 (2006.01)
G06F 9/44 (2006.01)
G06F 9/445 (2006.01)
H04L 12/24 (2006.01)

(52) U.S. Cl.
CPC .............. H04L 41/0846 (2013.01); G06F 8/63 (2013.01)
USPC ........... 709/213; 709/221; 709/226; 717/172; 717/178

(58) Field of Classification Search
USPC .......... 709/213, 221, 226; 717/172, 171, 173, 717/178
See application file for complete search history.

(56) References Cited

U.S. PATENT DOCUMENTS

| 6,765,919 | B1 * | 7/2004 | Banks et al. | 370/401 |
|---|---|---|---|---|
| 7,257,811 | B2 * | 8/2007 | Hunt et al. | 718/1 |
| 7,263,590 | B1 * | 8/2007 | Todd et al. | 711/165 |
| 7,403,987 | B1 * | 7/2008 | Marinelli et al. | 709/223 |
| 7,430,203 | B2 * | 9/2008 | Millet et al. | 370/389 |
| 7,437,753 | B2 * | 10/2008 | Nahum | 726/4 |
| 2003/0120772 | A1 | 6/2003 | Husain et al. | |

(Continued)

FOREIGN PATENT DOCUMENTS

| EP | 1 310 876 A1 | 5/2003 |
|---|---|---|
| JP | 2002063063 | 2/2002 |
| JP | 2001014261 | 1/2008 |

OTHER PUBLICATIONS

Cummings R: "The Evolution of Information Assurance", Computer, IEEE Service Center, Los Alamitos, CA, US, vol. 35, No. 12, Dec. 2002, pp. 65-72, XP001141249 ISSN: 0018-9162.
Fakhouri S A et al: "Gulfstream—a system for dynamic topology management in multi-domain server farms", $42^{nd}$ Annual Syumposium on Foundations of Computer Science (FOCS 2001).

(Continued)

Primary Examiner — Ninos Donabed
Assistant Examiner — Thomas Richardson
(74) Attorney, Agent, or Firm — DeLizio Gilliam, PLLC

(57) ABSTRACT

Methods, systems, and computer program products are provided for migrating an operating system from a source computer to a destination computer. Some embodiments include identifying a destination adapter of the destination computer that is coupled for data communications to a SAN that is also coupled for data communications to a source adapter of the source computer, logging off a virtual port name of the source adapter from the login manager, deregistering the virtual port name from the source adapter, registering the virtual port name with the destination adapter, and logging on the destination adapter to the login manager with the virtual port name. Typical embodiments also include transferring the operating system from the source computer to the destination computer.

30 Claims, 7 Drawing Sheets

(56) References Cited

U.S. PATENT DOCUMENTS

2003/0195956 A1* 10/2003 Bramhall et al. ............ 709/223
2003/0212854 A1   11/2003 Kitamura et al.
2005/0198523 A1*  9/2005 Shanbhag et al. ............ 713/200
2008/0034249 A1*  2/2008 Husain et al. ..................... 714/3

OTHER PUBLICATIONS

Las Vegas, Oct. 14-17, 2001, Annual Symposium on Foundations of Computer Science, Los Alamitos, CA: IEEE Comp. Soc, US, Oct. 8, 2001. pp. 55-62, XP010565139 ISBN: 0-7695-1390-5.

Menon J et al: "IBM Storage Tank—A Heterogeneous Scalable San File System", IBM Systems Journal IBM Corp. Armonk, New York, us, vol. 42, No. 2, 2003, p. 250-287, XP0011713295 ISSN: 0018-8670.

Lachaize R et al: "Simplifying administration through dynamic reconfiguration in a cooperative cluster storage system", Cluster Computer, 2004 IEEE International Conferenceon San Diego, CA, USA Sep. 20-23, 2004, Piscataway, NJ, USA, IEEE, Sep. 20, 2004, pp. 175-184, XP010770294 ISBN: 0-7603-8694-9.

PCT Search Report & Written Opinion; PCT/EP2005/056586; Feb. 6, 2006; European Patent Office; DE.

* cited by examiner

OPERATING SYSTEM MIGRATION WITH MINIMAL STORAGE AREA NETWORK RECONFIGURATION

BACKGROUND OF THE INVENTION

1. Field of the Invention

The field of the invention is data processing, or, more specifically, methods, systems, and products for migrating an operating system from a source computer to a destination computer.

2. Description of Related Art

There are a number of situations where operating system migration from a source computer to a destination computer is appropriate and commonly performed. If a system administrator is planning hardware maintenance on the source computer hardware, for example, the system administrator may migrate the operating system including its currently installed applications to another computer. Another situation where operating system migration is appropriate and often performed is when an operating system running one source computer has outgrown the physical resource limitations of that source computer's hardware and a system administrator may want to migrate to another computer whose hardware that can accommodate the resource requirements.

Performing operating system migration poses a number of challenges when the operating system is operating as a component in a complex network, such as for example, a Storage Area Network ('SAN'). A SAN is a dedicated network that serves to interconnect storage-related resources available to one or more networked servers. A SAN is typically separate from local area networks ('LANs') and wide area networks ('WANs'). SANs are often characterized by high interconnection data rates between member storage peripherals. SANs are also often characterized by highly scalable architectures. SANs include both hardware and software for hardware management, monitoring, and configuration.

One reason operating system migration poses a challenge when the operating system to be migrated is connected to a SAN, is that SANs are typically 'zoned.' Zoning is a logical grouping of hosts and resources. A zoned operating system is only allowed access to storage devices within the operating system's zone. Zoning a SAN has a number of benefits including load balancing, dedication of storage capacity, data integrity, and security, as well as others that will occur to those of skill in the art.

One type of zoning that is commonly implemented with a SAN is logical unit masking ('LUN masking'). In LUN masking, each storage device is subdivided into logical units ('LUNs') and each storage device restricts operating systems access to a particular LUN. That is, an operating system is only allowed access to storage within its LUN.

Conventional operating system migration techniques require extensive reconfiguration of the SAN to the operating system to access the same storage in the same LUNs after migration. There is therefore an ongoing need for methods, systems, and products for migrating an operating system from a source computer to a destination computer that requires little or no reconfiguration of a storage area network.

SUMMARY OF THE INVENTION

Methods, systems, and computer program products are provided for migrating an operating system from a source computer to a destination computer. Some embodiments include identifying a destination adapter of the destination computer that is coupled for data communications to a SAN that is also coupled for data communications to a source adapter of the source computer, logging off a virtual port name of the source adapter from a login manager, deregistering the virtual port name from the source adapter, registering the virtual port name with the destination adapter, and logging on the destination adapter to the login manager with the virtual port name. Typical embodiments also include transferring the operating system from the source computer to the destination computer.

In typical embodiments, identifying a destination adapter of the destination computer that is coupled for data communications to a SAN that is also coupled for data communications to a source adapter of the source computer includes querying a server for a world-wide port name of destination adapter. In typical embodiments, identifying a destination adapter of the destination computer that is coupled for data communications to a SAN that is also coupled for data communications to a source adapter of the source computer includes querying a server for the destination computer of the destination adapter.

In many embodiments, logging off a virtual port name of the source adapter from the login manager is carried out by disassociating an N_Port ID from the virtual port name. In many embodiments, logging on the destination adapter to the login manager with the virtual port name is carried out by associating an N_Port ID with the virtual port name.

Methods, systems, and computer program products are also provided for migrating an operating system from a source computer to a destination computer that include identifying a destination adapter of the destination computer that is coupled for data communications to a SAN that is also coupled for data communications to a source adapter of the source computer, removing the source adapter from a zone, adding the destination adapter to the zone, logging off the source adapter from a login manager, and logging on the destination adapter to the login manager. Typical embodiments also include transferring the operating system from the source computer to the destination computer.

In typical embodiments, removing the source adapter from a zone includes identifying a zone associated with the source adapter, identifying targets associated with the source adapter, disassociating the source adapter from the targets, and deleting the source adapter from the zone. In typical embodiments, adding the destination adapter to the zone includes identifying a zone associated with the source adapter, including the destination adapter in the zone, identifying targets associated with the source adapter, and associating the destination adapter with the targets.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for migrating an operating system from a source computer to a destination computer. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Operating System Migration with

Minimal Storage Area Network Reconfiguration

Figure 1:
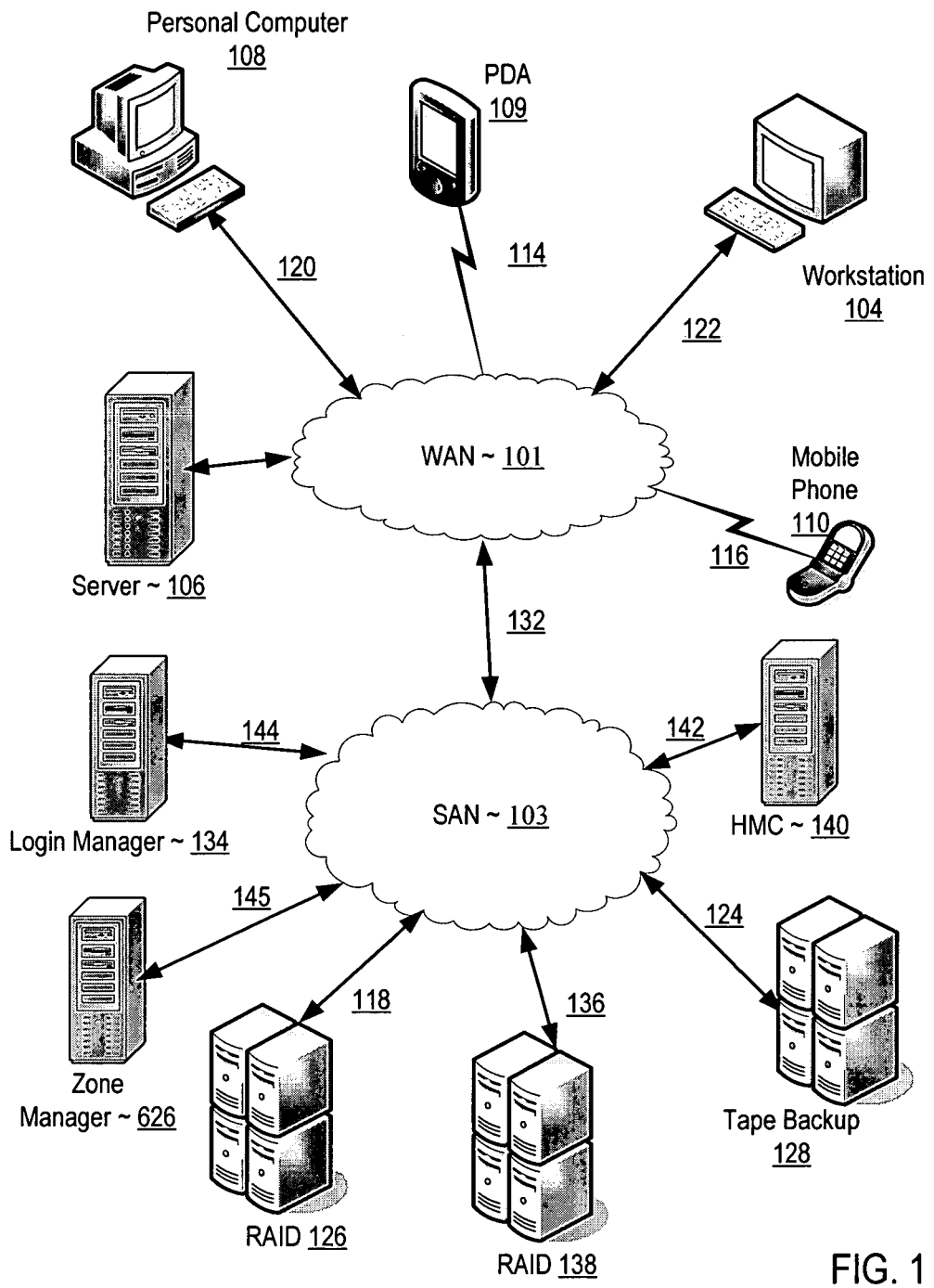
FIG. 1 depicts an exemplary data processing system capable of migrating an operating system from a source computer to a destination computer that requires little or no reconfiguration of a storage area network ('SAN').

Methods, systems, and products for migrating an operating system from a source computer to a destination computer are now described with reference to the accompanying drawings, beginning with FIG. 1. FIG. 1 depicts an exemplary data processing system capable of migrating an operating system from a source computer to a destination computer that requires little or no reconfiguration of a storage area network ('SAN'). The system of FIG. 1 includes a number of computers connected for data communications in networks. Each of the computers of the system of FIG. 1 has installed upon it an operating system which may be migrated to another computer.

The data processing system of FIG. 1 includes wide area network ("WAN") (101) and storage area network ("SAN") (103). The network connection aspect of the architecture of FIG. 1 is only for explanation, not for limitation. In fact, systems for migrating an operating system from a source computer to a destination computer according to embodiments of the present invention may also be connected as LANs, WANs, intranets, internets, the Internet, webs, the World Wide Web itself, or other connections as will occur to those of skill in the art. Such networks are media that may be used to provide data communication connections between various devices, computers, and computer storage connected together within an overall data processing system.

In the example of FIG. 1, several exemplary devices including a PDA (109), a computer workstation (104), a mobile phone (110), and personal computer (108) are connected to a WAN (101). The network-enabled mobile phone (109) connects to the WAN (101) through a wireless link (116), and the PDA (112) connects to the WAN (101) through a wireless link (114). In the example of FIG. 1, the personal computer (108) connects through a wireline connection (120) to the WAN (101), and the computer workstation (104) connects through a wireline connection (122) to the WAN (101).

In the example of FIG. 1, each of the computers connected to the WAN (101) may access a storage area network ('SAN') (103) that provides a number of storage devices. In the example of FIG. 1 two redundant arrays of independent disks ('RAIDs') (126 and 138) are connected to the SAN (103) through fiber optic connections (118 and 136). Redundant arrays of independent disks are disk drives that employ two or more drives in combination for improved fault tolerance and improved performance. In the example of FIG. 1, a tape backup (128) is also connected to the SAN (103) through a fiber optic connection (124).

In the example of FIG. 1, the SAN (103) is a Fibre Channel network. Fibre Channel is a protocol suite for transfer of data within a SAN. Fibre Channel is an architecture developed by a consortium of computer and mass storage device manufacturers currently being standardized by the American National Standards Institute ('ANSI'). Fibre Channel was designed for mass storage devices and other peripheral devices that require very high bandwidth. Using optical fiber to connect devices, Fibre Channel supports high data transfer rates. Interested readers may find additional information about Fibre Channel in the currently available Fibre Channel specification, which is ANSI document number ANSI/INCITS 373 entitled *Information Technology-Fibre Channel Framing and Signaling Interface (FC-FS)*.

While in this specification, methods, systems, and products for migrating an operating system from a source computer to a destination computer are described with reference to Fibre Channel, this is for explanation and not for limitation. In fact, migrating an operating system from a source computer to a destination computer may employ many different SAN technologies such as for example, InfiniBand®, iSCSI SAN, and others as will occur to those of skill in the art.

In the example of FIG. 1, a login manager (134) connects to the SAN (103) through a fiber optic link (144). The login manager (134) administers logging in adapters and logging off adapters with the SAN. The exemplary SAN of FIG. 1 also includes a zone manager (626) that implements zoning on the SAN by providing each operating system connected to the SAN access to that operating system's assigned storage devices.

In some methods of migrating an operating system from a source computer to a destination computer, the operating system to be migrated includes a migration module that facilitates migration according to embodiments of the present invention.

In some such embodiments, the migration module in the operating system is capable generally of identifying a destination adapter of the destination computer that is coupled for data communications to a SAN that is also coupled for data communications to a source adapter of the source computer, logging off a virtual port name of the source adapter from a login manager, and deregistering the virtual port name from the source adapter. After being transferred from the source computer to the destination computer, the migration module of the operating system is capable generally of registering the virtual port name with the destination adapter and logging on the destination adapter to the login manager with the virtual port name. Such embodiments do not require the SAN to be reconfigured as a part of migration. Instead, such embodiments include registering the operating system with the destination adapter and logging the destination adapter onto the login manager (134) with the same virtual port name that was previously in use by the source adapter of the source computer.

To establish Fibre Channel connectivity, a port name of a Fibre channel adapter must be associated with an N-Port ID. Each end point on the connection is called an N_Port (Node Port), which contains both an N_Port ID and a Port Name. The N_Port ID of the destination port is the destination address of Fibre Channel frames sent to that port, and the N_Port ID of the source port is the source address. The Port Name is a world wide unique identifier (analogous to MAC addresses in Ethernet) that can be queried by others in the SAN to determine the identity of that N_Port.

Conventional Fibre Channel adapters are assigned a burned-in world-wide port name ('WWPN') that uniquely identifies the adapter and is used to establish Fibre Channel connectivity. These burned-in world-wide port names are static and cannot be assigned to other adapters. N_Port ID Virtualization ('NPIV') however provides a Fibre Channel facility for assigning a virtual port name to an adapter. NPIV allows a single fibre channel adapter to be assigned more than one virtual port name. NPIV also advantageously allows a single virtual port name to be moved from one source Fibre Channel adapter to another destination Fibre Channel adapter thereby facilitating migrating an operating system from a source computer to a destination computer without reconfiguration of the SAN according to embodiments of the present invention.

As discussed above, migrating an operating system from a source computer to a destination computer without reconfiguration may in some embodiments be performed by a migration module of the operating system to be migrated. In alternative embodiments, migrating an operating system from a source computer to a destination computer is carried out with minor reconfiguration of the SAN. In the example of FIG. 1, a Host Management Console ('HMC') (140) is connected to the SAN through either in-band or out-of-band connection (142). The IMC (140) is capable of facilitating migration of operating system from a source computer to a destination computer with only minimal SAN reconfiguration by identifying a destination adapter of the destination computer that is coupled for data communications to a SAN that is also coupled for data communications to a source adapter of the source computer, removing the source adapter from a zone, adding the destination adapter to the zone, and instructing the operating system to log off the source adapter from the login manager. After the operating system is transferred from the source computer to the destination computer, the HMC is capable of instructing the operating system to log on the destination adapter to the login manager.

The arrangement of devices making up the exemplary system illustrated in FIG. 1 are for explanation, not for limitation. Data processing systems useful according to various embodiments of the present invention may include additional servers, routers, other storage devices, and peer-to-peer architectures, not shown in FIG. 1, as will occur to those of skill in the art. Networks in such data processing systems may support many data communications protocols, including for example TCP/IP, HTTP, WAP, HDTP, Fibre Channel, InfiniBand, and others as will occur to those of skill in the art. Various embodiments of the present invention may be implemented on a variety of hardware platforms in addition to those illustrated in FIG. 1.

As mentioned above, migrating an operating system from a source computer to a destination computer in accordance with the present invention is generally implemented with computers, that is, with automated computing machinery. For further explanation, FIG. 2 sets forth a block diagram of automated computing machinery comprising a computer (152) useful in migrating an operating system from a source computer to a destination computer according to embodiments of the present invention. The computer (152) of FIG. 2 includes at least one computer processor (156) or 'CPU' as well as random access memory (168) ("RAM").

Figure 2:
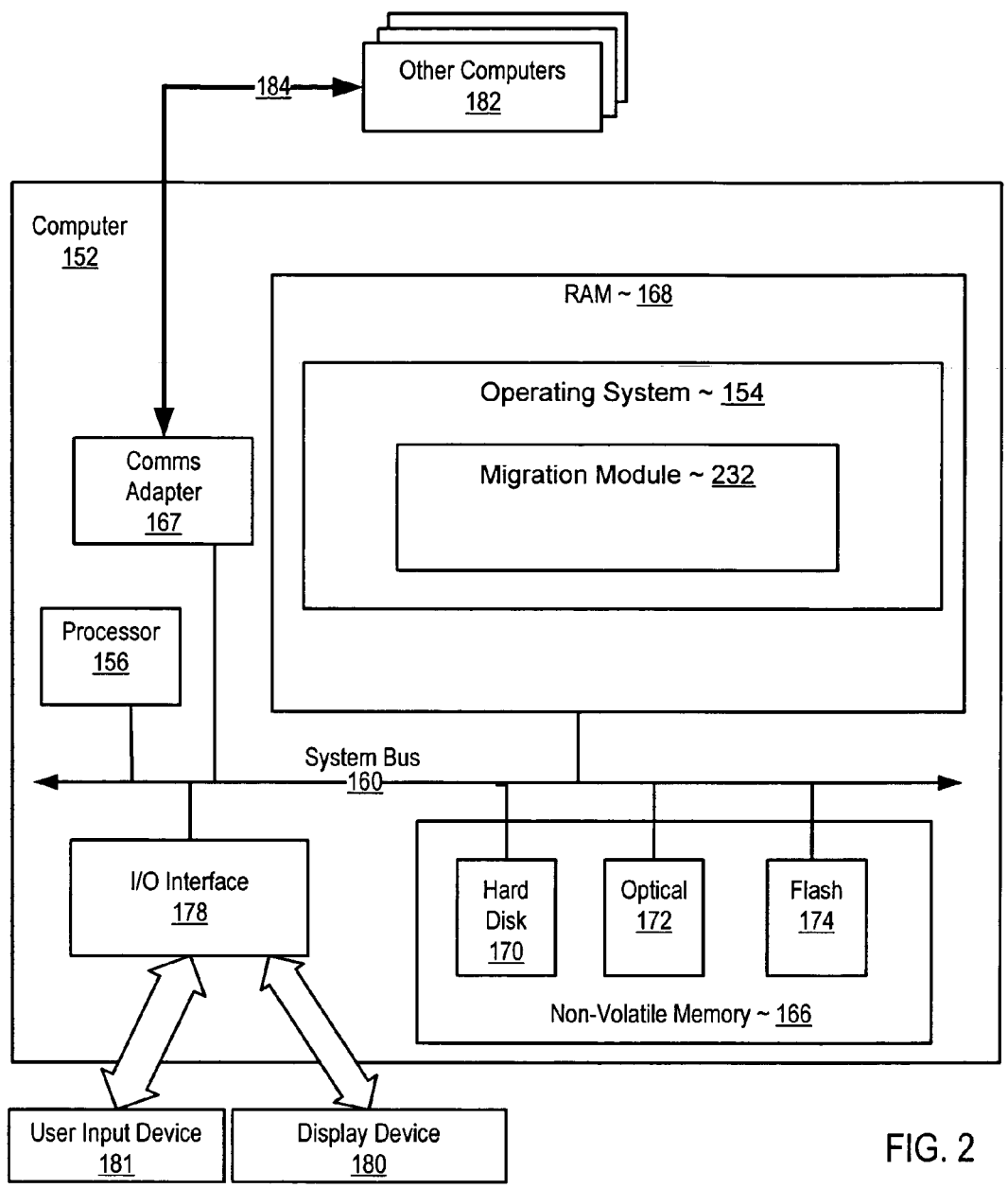
FIG. 2 sets forth a block diagram of automated computing machinery useful in migrating an operating system from a source computer to a destination computer according to embodiments of the present invention.

Stored in RAM (168) is an operating system (154). Operating systems useful in computers according to embodiments of the present invention include Unix, Linux, Windows NT™, i5/OS™, and many others as will occur to those of skill in the art. The operating system (154) in the example of FIG. 2 is shown in RAM (168), but many components of an operating system typically are stored in non-volatile memory (166) also. As discussed above, in some embodiments of the present invention, migration of the operating system is performed largely by the operating system to be migrated. The exemplary operating system of FIG. 2 therefore includes a migration module (232) capable of identifying a destination adapter of the destination computer that is coupled for data communications to a SAN that is also coupled for data communications to a source adapter of the source computer, logging off a virtual port name of the source adapter from a login manager, and deregistering the virtual port name from the source adapter. After transferring the operating system from the source computer to the destination computer, the migration module is capable generally of registering the virtual port name with the destination adapter and logging on the destination adapter to the login manager with the virtual port name.

The computer (152) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (152) of FIG. 2 includes a communications adapter (167) for implementing connections for data communications (184), including connections through networks, to other computers (182), including servers, clients, data storage in the SAN, and others as will occur to those of skill in the art. Communications adapters implement the hardware level of connections for data communications through which local devices and remote devices or servers send data communications directly to one another and through networks. Examples of communications adapters useful for migrating an operating system from a source computer to a destination computer according to embodiments of the present invention include Fibre Channel adapters, modems for wired dial-up connections, Ethernet (IEEE 802.3) adapters for wired LAN connections, and 802.11b adapters for wireless LAN connections.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

As discussed above, migrating an operating system from a source computer to a destination computer according to embodiments of the present invention may be facilitated by a migration module in the operating system to be migrated or by a third party entity such as for example a host management console coupled for data communications with the source and destination computers. Migrating an operating system from a source computer to a destination computer may also be carried out in some embodiments with no reconfiguration of the SAN and in other embodiments with only minimal reconfiguration of the SAN. For further explanation, FIG. 3 sets forth a flow chart illustrating an exemplary method for migrating an operating system from a source computer (316) to a destination computer (320) that requires no reconfiguration of the SAN and may be carried out by a migration module within the operating system to be migrated.

Figure 3:
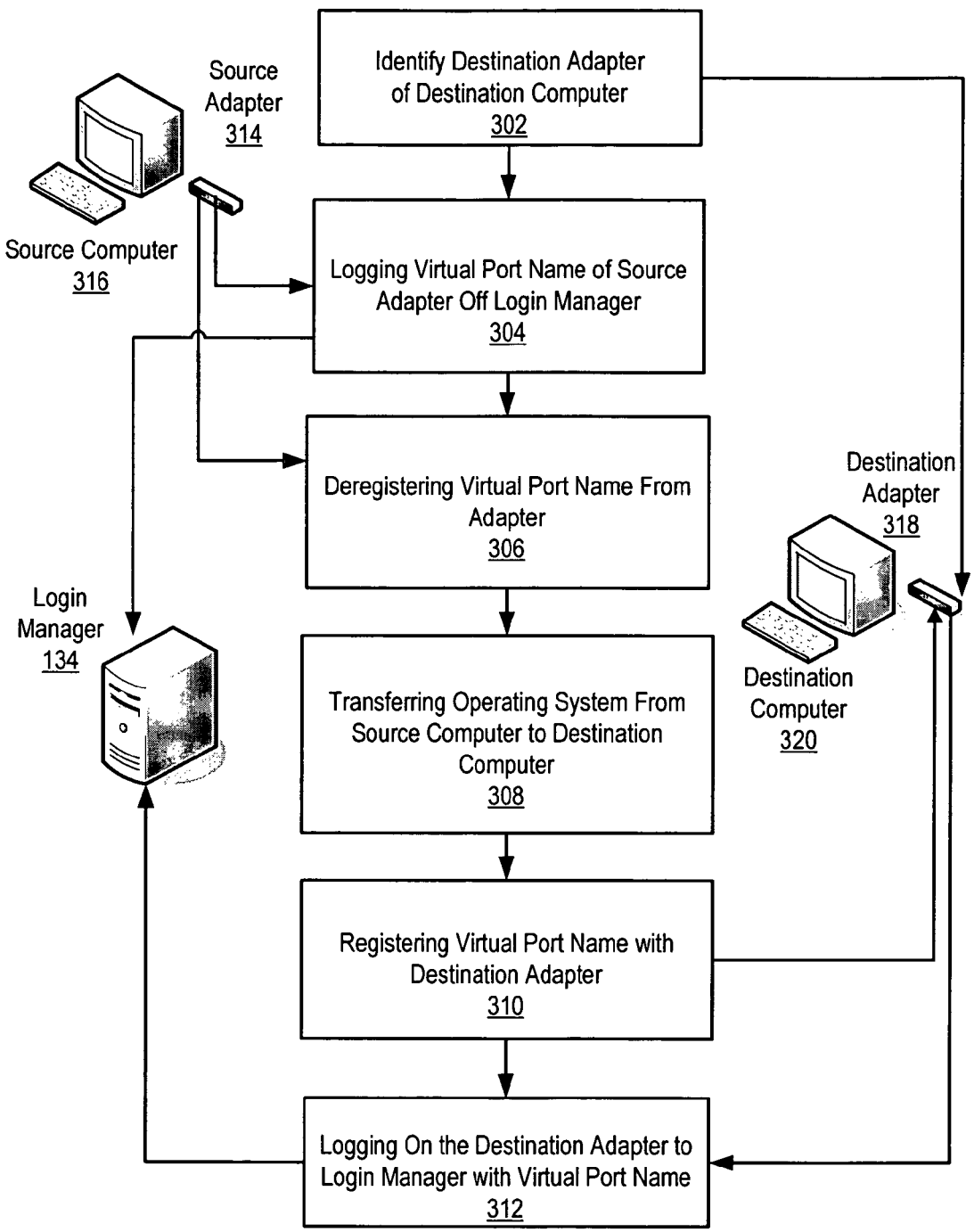
FIG. 3 sets forth a flow chart illustrating an exemplary method for migrating an operating system from a source computer to a destination computer that requires no reconfiguration of the SAN and may be carried out by a migration module within the operating system to be migrated.
Figure 4:
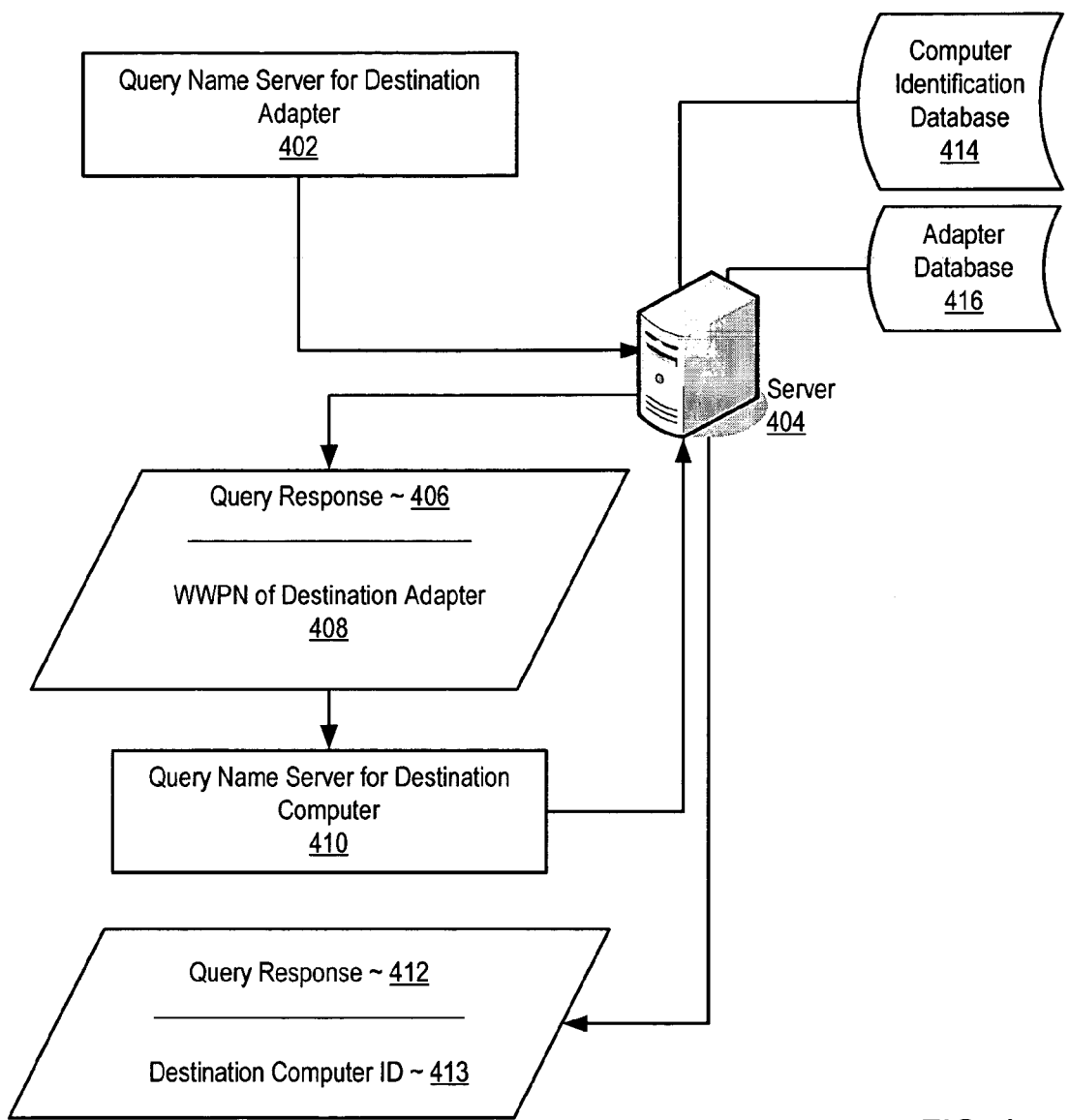
FIG. 4 sets forth an exemplary method for identifying a destination adapter of the destination computer that is coupled for data communications to a SAN that is also coupled for data communications to a source adapter of the source computer manager.

The method of FIG. 3 includes identifying (302) a destination adapter (318) of the destination computer (320) that is coupled for data communications to a SAN that is also coupled for data communications to a source adapter (314) of the source computer (316). Identifying (302) a destination adapter (318) of the destination computer (320) that is coupled for data communications to a SAN that is also coupled for data communications to a source adapter (314) of the source computer (316) is carried out by use of in-band communications within the SAN or through out-of-band communications outside the SAN. For further explanation of an exemplary technique of identifying a destination adapter, FIG. 4 sets forth an exemplary method for identifying a destination adapter of the destination computer that is coupled for data communications to a SAN that is also coupled for data communications to a source adapter of the source computer. The method of FIG. 4 includes querying (402) a server (404) within the SAN for a world-wide port name (408) of destination adapter and receiving a query response (406) including the world-wide port name (408) of the destination adapter. As discussed above a world-wide port name is a unique Fibre Channel identifier that is burned into the adapter and therefore is a static and unique identification of the adapter. In the example of FIG. 4, the server (404) maintains an adapter identification database (416) that includes identifications of adapters that are coupled for data communications with the SAN. The server (404) of FIG. 4 may be installed upon the login manager or located at another location coupled for data communications with the source computer.

Having identified an adapter of a destination computer that is coupled for data communications with a SAN that is also coupled for data communication with the source adapter, the method of FIG. 4 continues by identifying the destination computer having that adapter installed upon it. That is, the operating system must be migrated to the computer associated with the adapter coupled for data communications with the SAN. The method of FIG. 4 therefore also includes querying (410) a server (404) for an identification of the destination computer (413) of the destination adapter (408) and receiving a query response (412) that includes a destination computer ID (414) identifying the destination computer. In the example of FIG. 4, the server (404) includes a computer identification database (414) that includes computer IDs indexed by adapter IDs for identification of destination computers having an adapter with connectivity to the SAN. Such computers are candidates for operating system migration according to embodiments of the present invention.

Again with reference to FIG. 3: After identifying a destination adapter of a destination computer, the method of FIG. 3 continues by logging off (304) a virtual port name of the source adapter (314) from a login manager (134). As described above, a Fibre Channel N-Node comprises a port name and an N-Port ID. Logging off (304) a virtual port name of the source adapter (314) from the login manager (134) according to the method of FIG. 3 is carried out by disassociating an N_Port ID from the virtual port name. The Fibre Channel specification provides a standard fabric logout function LOGO that disassociates the N_Port ID from tire virtual port name.

After disassociating the N_Port ID with the virtual port name, typical embodiments also include logging off all input/output ('I/O') devices providing access to storage devices on the SAN. Logging off of all input/output devices advantageously ensures that the I/O devices terminate any remaining commands initiated prior to migration.

The method of FIG. 3 also includes deregistering (306) the virtual port name from the source adapter (314). In the method of FIG. 3, deregistering (306) the virtual port name from the source adapter is typically carried out by the operating system to be migrated.

The method of FIG. 3 also includes transferring (308) the operating system from the source computer (316) to the destination computer (320). Transferring (308) the operating system from the source computer (316) to the destination computer (320) is often carried out by a system administrator and often includes copying the operating system from the source computer to the destination computer. In some embodiments, transferring (308) the operating system from the source computer (316) to the destination computer (320) includes copying the operating system from the source computer to an intermediate storage media such as a disk and then copying the operating system from the intermediate storage media to the destination computer.

After the operating system is transferred from the source computer to the destination computer, the method of FIG. 3 includes registering (310) the virtual port name with the destination adapter (318). In many embodiments of the method of FIG. 3, registering (310) the virtual port name with the destination adapter (318) is carried out by the operating system to be migrated.

The method of FIG. 3 also includes logging on (312) the destination adapter (318) to the login manager (134) with the virtual port name. As described above, a Fibre Channel N-Node comprises a port name and an N-Port ID. Logging on (312) the destination adapter (318) to the login manager (134) with the virtual port name according to the method of FIG. 3 may be carried out by associating an N_Port ID with the virtual port name. The Fibre Channel specification provides a standard function FDISC issued by the Fibre Channel adapter to a login manager instructing the login manager to assign an N-Port ID to the adapter to establish an N-Node. In the method of FIG. 3, the FDSIC function is parameterized with the virtual port name previously in use with the source adapter. Because zoning and LUN masking in the SAN are based on virtual port names, migration according to the method of FIG. 3 advantageously provides access to the same storage devices available to the source computer before the migration without reconfiguration of the SAN.

After acquiring an N_Port ID, logging on (312) the destination adapter (318) to the login manager (134) with the virtual port name also includes logging into the I/O devices that were previously logged off of prior to migration with the new N_Port ID. The Fibre Channel specification provides a port login (PLOGI) process to log into I/O devices.

The method of FIG. 3 advantageously provides method for operating system migration that does not require reconfiguration of the SAN because the method of FIG. 3 utilizes virtual port names. For further explanation, FIG. 5 sets forth another method for migrating an operating system from a source computer to a destination computer that does not require the use of virtual port names and employs only minimal reconfiguration of the SAN. The method of FIG. 5 may be facilitated by a third-party entity such as for example a host management console ('HMC') coupled for data communications with the SAN.

Figure 5:
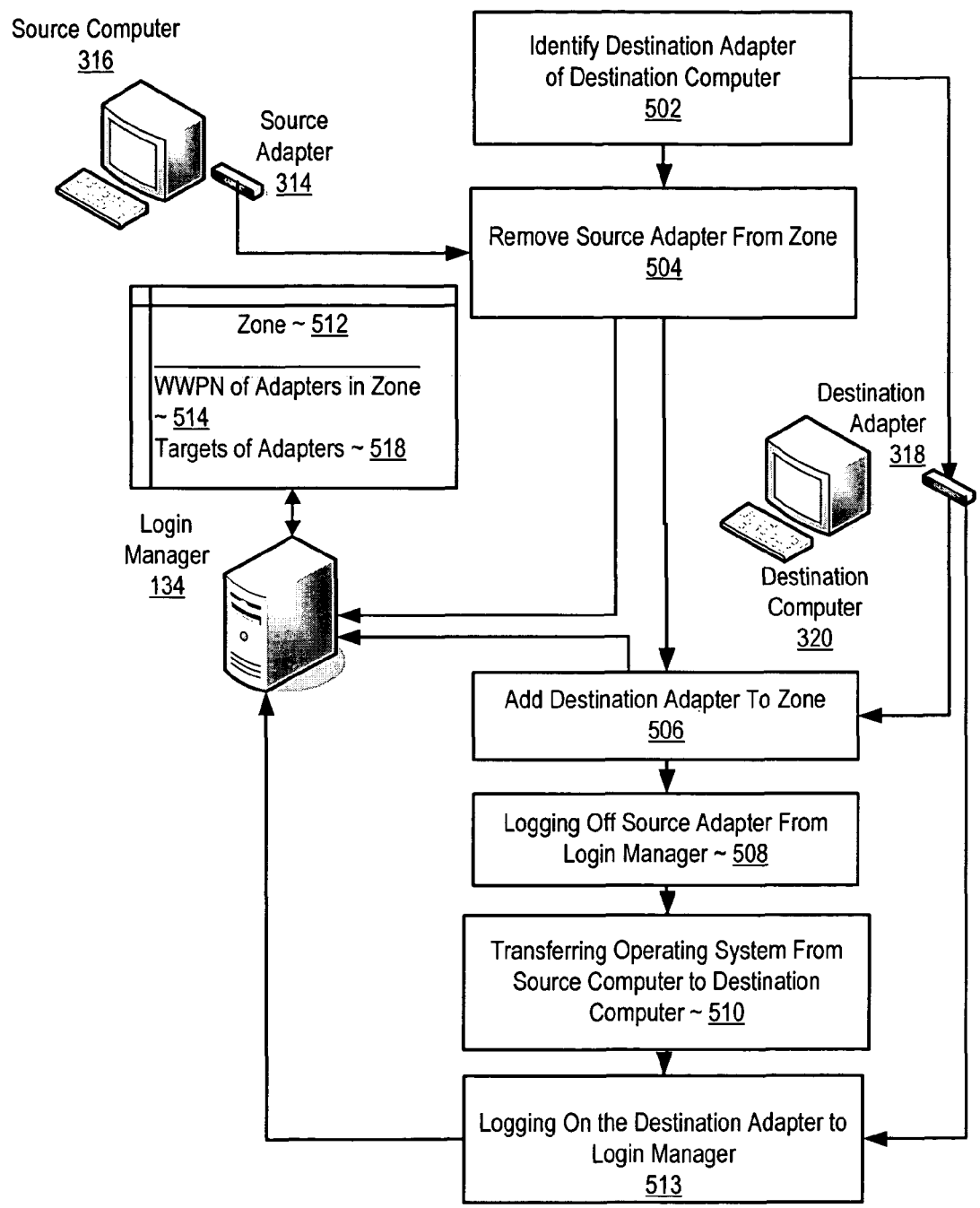
FIG. 5 sets forth another method for migrating an operating system from a source computer to a destination computer that does not require the use of virtual port names and employs only minimal reconfiguration of the SAN.

The method of FIG. 5 includes identifying (502) a destination adapter (318) of the destination computer (320) that is coupled for data communications to a SAN that is also coupled for data communications to a source adapter (314) of the source computer (316). As described above with reference to FIG. 4, identifying a destination adapter of the destination computer that is coupled for data communications to a SAN that is also coupled for data communications to a source adapter of the source computer may be carried out by querying a server within the SAN for a world-wide port name of a destination adapter and then querying a server for the destination computer of the destination adapter to identify a candidate destination computer for migration.

The method of FIG. 5 also includes removing (504) the source adapter (314) from a zone (512). As discussed above, a zone is logical grouping of hosts and resources. The exemplary zone (512) of FIG. 5 includes a plurality of adapters in the zone (514) identified by their burned-in world-wide port name. The exemplary zone (512) of FIG. 5 also associates targets (518) with the adapters (514). Targets are actual storage devices within the zone to which the operating system has access for data storage through their associated adapter.

Figure 6:
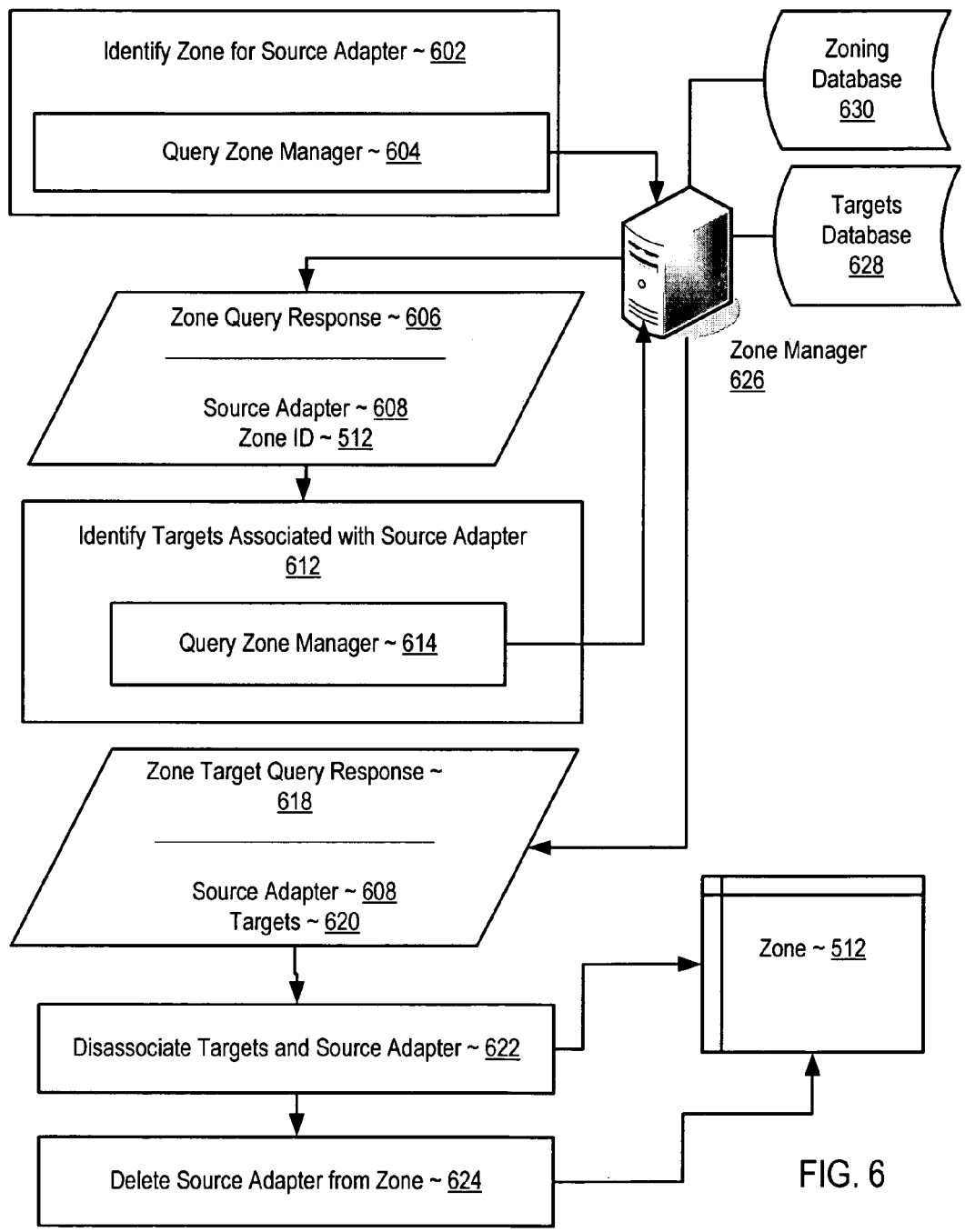
FIG. 6 sets forth a flow chart illustrating an exemplary method for removing the source adapter from a zone.

For further explanation, FIG. 6 sets forth a flow chart illustrating an exemplary method for removing the source adapter from a zone. The method of FIG. 6 includes identifying (602) a zone (512) associated with the source adapter (608). In the method of FIG. 6, identifying (602) a zone (512) associated with the source adapter (608) is carried out by querying a zone manager (626) and receiving a zone query response (606) containing an identification of the zone (512). The zone manager (626) of FIG. 6 maintains a zoning database (630) including identifications of adapters indexed by their associated zones. In the example of FIG. 6, the zone manager (626) looks up the zone associated with the adapter and issues a zone query response (606) containing the source adapter ID (608) and a zone ID (512) uniquely identifying the zone to which the source adapter is assigned.

Removing the source adapter from a zone according to the method of FIG. 6 also includes identifying (612) targets (620) associated with the source adapter (608). As mentioned above, targets are actual storage devices within the zone to which the operating system has access for data storage. In the example of FIG. 6, identifying (612) targets (620) associated with the source adapter (608) is carried out by querying the zone manager (626) and receiving a zone target query response (618) containing an identification of the targets (620). In the example of FIG. 6, the zone manager (626) maintains a targets database (628) that includes the targets indexed by associated adapters. The zone manager (626) issues a zone target query response (618) containing a source adapter identification (608) and the targets (620) associated with the source adapter.

Removing the source adapter from a zone according to the method of FIG. 6 includes disassociating (622) the source adapter (608) from the targets (620) and deleting (624) the source adapter from the zone (512). Disassociating the source adapter from the targets before migration of the operating system advantageously frees the targets for association with the destination source adapter after migration of the operating system to the destination computer.

Figure 7:
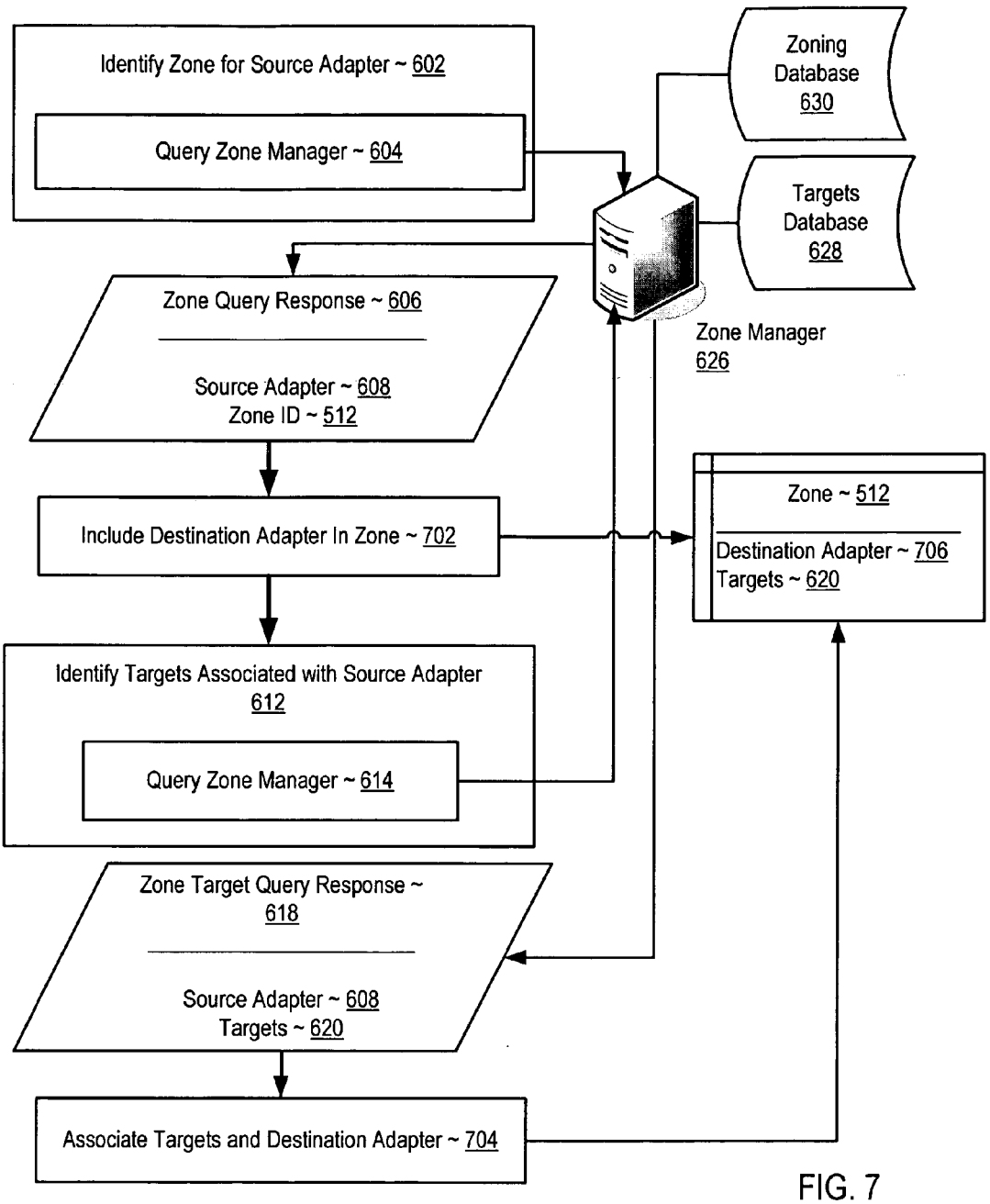
FIG. 7 sets forth a flow chart illustrating an exemplary method of adding the destination adapter to a zone.

Again with reference to FIG. 5: After removing (504) the source adapter (314) from a zone (512), the method of FIG. 5 continues by adding (506) the destination adapter (318) to the zone (512). For further explanation, FIG. 7 sets forth a flow chart illustrating an exemplary method of adding the destination adapter to a zone. Adding the destination adapter to the zone according to the method of FIG. 7 is carried out by identifying (602) a zone (512) associated with the source adapter. As described above with reference to FIG. 6, identifying (602) a zone (512) associated with the source adapter (608) is carried out by querying (604) a zone manager (626) and receiving a zone query response (606) containing an identification of the zone (512). The zone manager (626) of FIG. 7 maintains a zoning database (630) including identifications of adapters indexed by their associated zones. In the example of FIG. 6, the zone manager (626) looks up the zone associated with the adapter and issues a zone query response (606) containing the source adapter ID (608) and a zone ID (512) uniquely identifying the zone to which the source adapter is assigned.

Adding the destination adapter to the zone according to the method of FIG. 7 also includes (702) the destination adapter (706) in the zone (512). Including (702) the destination adapter (706) in the zone (512) advantageously adds the destination adapter as one of the contents or member, elements of the zone.

Adding the destination adapter to the zone according to the method of FIG. 7 is also includes identifying (612) targets (620) associated with the source adapter (608). As mentioned above, targets are actual storage devices within the zone to which the operating system has access for data storage. In the example of FIG. 7, identifying (612) targets (620) associated with the source adapter (608) is carried out by querying the zone manager (626) and receiving a zone target query response (618) containing an identification of the targets (620). In the example of FIG. 7, the zone manager maintains a targets database (628) that includes the targets indexed by associated adapters. The zone manager (626) issues a zone target query response (618) containing an identification of the source adapter (608) and an identification of the targets (620) associated with the source adapter.

Adding the destination adapter to the zone according to the method of FIG. 7 also includes associating (704) the destination adapter (706) with the targets (620). Associating (704) the destination adapter (706) with the targets (620) advantageously links the targets with the destination adapter thereby facilitating the migrated operating system's access to the targets after migration to the destination computer.

Again with reference to FIG. 5, after adding the destination adapter to the zone, the method of FIG. 5 continues by logging off (508) the source adapter (314) from the login manager (134). As discussed above, in many embodiments, the method of FIG. 5 is facilitated by an HMC. In such embodiments, after adding the destination adapter to the zone the HMC instructs the operating system to log off the source adapter from the login manager. As described above, a Fibre Channel N-Node comprises a port name and an N-Port ID. Logging off (508) the source adapter (314) from the login manager (134) is carried out by disassociating an N_Port ID from a port name. In contrast with the method of FIG. 3, the method of FIG. 5 does not require the use of virtual port names and therefore the port name of the adapter in the example of FIG. 5 may be either a virtual port name or a burned-in world-wide port name. The Fibre Channel specification provides a standard fabric logout function LOGO that disassociates the N_Port ID from the port name.

After disassociating the N_Port ID with the port name, typical embodiments also include logging off of all input/output ('I/O') devices providing access to storage devices on the SAN. Logging off of all input/output devices advantageously ensures that the I/O devices terminate any remaining commands initiated prior to migration.

The method of FIG. 5 also includes transferring (510) the operating system from the source computer (316) to the destination computer (320). Transferring (510) the operating system from the source computer (316) to the destination computer (320) is typically carried out by third party such as a system administrator and typically includes copying the operating system from the source computer to the destination computer. In some embodiments, transferring (510) the operating system from the source computer (316) to the destination computer (320) includes copying the operating system from the source computer to an intermediate storage media such as a disk and then copying the operating system from the intermediate storage media to the destination computer.

After transferring the operating system from the source computer to the destination computer, the method of FIG. 5 includes logging on (513) the destination adapter (318) to the login manager (134). As discussed above, in many embodiments, the method of FIG. 5 is facilitated by an HMC. In such embodiments, after transferring the operating system from the source computer to the destination computer the HMC instructs the operating system to log on the source destination adapter to the login manager. As described above, a Fibre Channel N-Node comprises a port name and an N-Port ID. Logging on the destination adapter to the login manager may be carried out by associating an N_Port ID with a port name. In contrast with the method of FIG. 3, the method of FIG. 5 does not require the use of virtual port names and therefore the port name of the adapter in the example of FIG. 5 may be either a virtual port name or a burned-in world-wide port name. The Fibre Channel specification provides a standard function for logging in burned-in world-wide port names, FLOGI, issued by the Fibre Channel adapter to a login manager instructing the login manager to assign an N-Port ID to the adapter to establish an N-Node.

After acquiring an N_Port ID, logging on the destination adapter to the login manager according to the method of FIG. 5 also includes logging into the I/O devices that were previously logged off of prior to migration with the new N_Port ID. The Fibre Channel specification provides a port login (PLOGI) process to log into I/O devices.

Migrating an operating system from a source computer to a destination computer according to embodiments of the present invention provide a number of advantages. Such advantageous include:

The destination adapter of the destination computer to which the operating system is migrated can be automatically identified using either in-band or out-of-band queries.

No SAN reconfiguration is required to support OS migration in some embodiments and only minimal reconfiguration is required in others.

Operating system migration can occur without major disruption to ongoing OS operation because no shutdown operations need to be done prior to migration. Uncompleted commands that may have been in process prior to migration will be abnormally terminated, but they will be automatically re-executed after migration through normal error recovery.

Because no shutdown operations are required during migration, software drivers do not need to be reconfigured to support migration and applications may continue without interruption.

The general techniques described in this specification are applicable to SAN technologies other than Fibre Channel.

Operating system migration according to some embodiments of the present invention does not require virtual port names and therefore does not require the use of N Port ID Virtualization. Providing a method that does not require virtual port names is advantageous for use in legacy configurations in which doe not support NPIV.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for migrating an operating system from a source computer to a destination computer, the method comprising:
    identifying a destination adapter of the destination computer that is coupled for data communications to a storage area network that is also coupled for data communications to a source adapter of the source computer;
    identifying a zone of the storage area network for the source adapter;
    removing the source adapter from the zone;
    adding the destination adapter to the zone;
    after adding the destination adapter to the zone, logging off the source adapter from a login manager of the storage area network;
    after logging off the source adapter from the login manager and after the operating system has been transferred from the source computer to the destination computer,
    logging on the destination adapter to the login manager.

2. The method of claim 1 wherein said removing the source adapter from the zone comprises:
    identifying storage devices of the zone associated with the source adapter;
    disassociating the source adapter from the storage devices; and
    deleting the source adapter from the zone.

3. The method of claim 1 wherein said adding the destination adapter to the zone comprises:
  including the destination adapter in the zone;
  identifying storage devices of the zone associated with the source adapter; and
  associating the destination adapter with the storage devices.

4. The method of claim 1 wherein said identifying the destination adapter of the destination computer that is coupled for data communications to the storage area network that is also coupled for data communications to the source adapter of the source computer comprises querying a server within the storage area network and receiving a world-wide port name of the destination adapter and querying the server and receiving an identifier of the destination computer based on the world-wide port name.

5. The method of claim 2 wherein said identifying the zone of the storage area network for the zone comprises querying a zone manager for the zone and receiving from the zone manager a zone identifier and an identifier of the source adapter, wherein said identifying the storage devices of the zone comprises querying the zone manager and receiving identifiers of the storage devices.

6. A system for migrating an operating system from a source computer to a destination computer, the system comprising:
  a processor;
  a network interface; and
  a migration module operable to,
  identify a destination adapter of the destination computer that is coupled for data communications to a storage area network that is also coupled for data communications to a source adapter of the source computer,
  identify a zone of the storage area network for the source adapter,
  remove the source adapter from the zone;
  add the destination adapter to the zone;
  after adding the destination adapter to the zone, log off the source adapter from a login manager of the storage area network;
  after logging off the source adapter from the login manager and after the operating system has been transferred from the source computer to the destination computer,
  log on the destination adapter to the login manager.

7. The system of claim 6 wherein the migration module being operable to remove the source adapter from the zone comprises the migration module being operable to:
  identify storage devices of the zone associated with the source adapter;
  disassociate the source adapter from the storage devices; and
  delete the source adapter from the zone.

8. The system of claim 6 wherein the migration module being operable to add the destination adapter to the zone comprises the migration module being operable to:
  include the destination adapter in the zone;
  identify storage devices of the zone associated with the source adapter; and
  associate the destination adapter with the storage devices.

9. The system of claim 6 wherein the migration module being operable to identify the destination adapter of the destination computer that is coupled for data communications to the storage area network that is also coupled for data communications to the source adapter of the source computer comprises the migration module being operable to query a server within the storage area network for a world-wide port name of the destination adapter and receive the world-wide port name of the destination adapter and being operable to query the server for an identifier of the destination of the computer based on the world-wide port name and receive the identifier of the destination computer.

10. The system of claim 7 wherein the migration module being operable to identify the zone of the storage area network for the source adapter comprises the migration module being operable to query a zone manager and to receive, in response, from the zone manager a zone identifier and an identifier of the source adapter, wherein the migration module being operable to identify the storage devices of the zone comprises the migration module being operable to query the zone manager and to receive, in response, identifiers of the storage devices.

11. A computer program product for migrating an operating system from a source computer to a destination computer, the computer program product disposed on a non-transitory computer-readable recording medium, the computer program product comprising program code executable to cause a data processing system to:
  identify a destination adapter of the destination computer that is coupled for data communications to a storage area network that is also coupled for data communications to a source adapter of the source computer;
  identify a zone of the storage area network for the source adapter;
  remove the source adapter from the add the destination adapter to the zone;
  after adding the destination adapter to the zone, log off the source adapter from a login manager of the storage area network
  after logging off the source adapter from the login manager and transferring the operation system from the source computer to the destination computer,
  log on the destination adapter to the login manager.

12. The computer program product of claim 11 wherein the program code being executable to cause the data processing system to remove the source adapter from the zone comprises the program code being executable to cause the data processing system to:
  identify storage devices associated with the source adapter;
  disassociate the source adapter from the storage devices; and
  delete the source adapter from the zone.

13. The computer program product of claim 11 wherein the computer program code being executable to cause the data processing system to add the destination adapter to the zone comprises the computer program code being executable to cause the data processing system to:
  including the destination adapter in the zone;
  identify storage devices associated with the source adapter; and
  associate the destination adapter with the storage devices.

14. The computer program product of claim 11 wherein the computer program code being executable to cause the data processing system to identify the destination adapter of the destination computer that is coupled for data communications to the storage area network that is also coupled for data communications to the source adapter of the source computer comprises the computer program code being executable to cause the data processing system to query a server within the storage area network for a world-wide port name of the destination adapter and to receive the world-wide port name, and to query the server with the world-wide port name and to receive an identifier of the destination computer.

15. The computer program product of claim 12 wherein the computer program code being executable to cause the data processing system to identify the zone of the storage area network for the source adapter comprises the computer program code being executable to cause the data processing system to query a zone manager and to receive, in response, from the zone manager a zone identifier and an identifier of the source adapter, wherein the computer program code being executable to cause the data processing system to identify the storage devices of the zone comprises the computer program code being executable to cause the data processing system to query the zone manager and to receive, in response, identifiers of the storage devices.

16. A method for migrating an operating system from a source computer to a destination computer, the method comprising:
identifying a destination adapter of the destination computer that is coupled for data communications to a storage area network that is also coupled for data communications to a source adapter of the source computer;
logging off a virtual port name of the source adapter from a login manager of the storage area network;
deregistering the virtual port name from the source adapter;
after transferring the operating system from the source computer to the destination computer, registering the virtual port name with the destination adapter; and
logging on the destination adapter to the login manager with the virtual port name.

17. The method of claim 16 further comprising logging off input/output devices that provide access to storage devices of the storage area network after logging off the virtual port name of the source adapter from the login manager.

18. The method of claim 16 wherein said identifying the destination adapter of the destination computer that is coupled for data communications to the storage area network that is also coupled for data communications to the source adapter of the source computer comprises querying a server within the storage area network for an identifier of the destination adapter, and querying the server for an identifier of the destination computer with the identifier of the destination adapter.

19. The method of claim 16 wherein said logging off the virtual port name of the source adapter from the login manager comprises disassociating an N_Port ID from the virtual port name.

20. The method of claim 16 wherein said logging on the destination adapter to the login manager with the virtual port name comprises associating an N_Port ID with the virtual port name.

21. A system for migrating an operating system from a source computer to a destination computer, the system comprising:
a processor;
a network interface; and
a migration module operable to,
identify a destination adapter of the destination computer that is coupled for data communications to a storage area network that is also coupled for data communications to a source adapter of the source computer;
log off a virtual port name of the source adapter from a login manager of the storage area network;
deregister the virtual port name from the source adapter;
after the operating system has been transferred from the source computer to the destination computer, register the virtual port name with the destination adapter; and
log on the destination adapter to the login manager with the virtual port name.

22. The system of claim 21 wherein the migration module being further operable to log off input/output devices that provide access to storage devices of the storage area network after logging off the virtual port name of the source adapter from the login manager.

23. The system of claim 21 wherein the migration module being operable to identify the destination adapter of the destination computer that is coupled for data communications to the storage area network that is also coupled for data communications to the source adapter of the source computer comprises the migration module being operable to query a server within the storage area network for an identifier of the destination adapter, and to query the server for an identifier of the destination computer with the identifier of the destination adapter.

24. The system of claim 21 wherein said the migration module being operable to log off the virtual port name of the source adapter from the login manager comprises the migration module being operable to disassociate an N_Port ID from the virtual port name.

25. The system of claim 21 wherein the migration module being operable to log on the destination adapter to the login manager with the virtual port name comprises the migration module being operable to associate an N_Port ID with the virtual port name.

26. A computer program product for migrating an operating system from a source computer to a destination computer, the computer program product disposed on a non-transitory computer-readable recording medium, the computer program product, which when executed by a data processing system, causes the data processing system to perform operations that comprise:
identifying a destination adapter of the destination computer that is coupled for data communications to the storage area network that is also coupled for data communications to a source adapter of the source computer;
logging off a virtual port name of the source adapter from a login manager of the storage area network;
deregistering the virtual port name from the source adapter;
registering the virtual port name with the destination adapter; and
after the operating system has been transferred from the source computer to the destination computer, logging on the destination adapter to the login manager with the virtual port name.

27. The computer program product of claim 26 wherein the operations further comprise logging off input/output devices that provide access to storage devices of the storage area network after logging off the virtual port name of the source adapter from the login manager.

28. The computer program product of claim 26 wherein the operation of identifying the destination adapter of the destination computer that is coupled for data communications to the storage area network that is also coupled for data communications to the source adapter of the source computer comprises querying a server within the storage area network for an identifier of the destination adapter, and querying the server for an identifier of the destination computer with the identifier of the destination adapter.

29. The computer program product of claim 26 wherein the operation of logging off the virtual port name of the source adapter from the login manager comprises disassociating an N_Port ID from the virtual port name.

30. The computer program product of claim 26 wherein the operation of logging on the destination adapter to the login manager with the virtual port name comprises associating an N_Port ID with the virtual port name.

* * * * *